United States Patent
Lopez et al.

(10) Patent No.: US 9,210,749 B2
(45) Date of Patent: Dec. 8, 2015

(54) SINGLE SWITCH DRIVER DEVICE HAVING LC FILTER FOR DRIVING AN LED UNIT

(75) Inventors: Toni Lopez, Kelmis (BE); Reinhold Elferich, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 167 days.

(21) Appl. No.: 14/125,787

(22) PCT Filed: Jun. 11, 2012

(86) PCT No.: PCT/IB2012/052936
§ 371 (c)(1),
(2), (4) Date: Dec. 12, 2013

(87) PCT Pub. No.: WO2012/172472
PCT Pub. Date: Dec. 20, 2012

(65) Prior Publication Data
US 2014/0117868 A1     May 1, 2014

(30) Foreign Application Priority Data
Jun. 17, 2011 (EP) .................. 11170268

(51) Int. Cl.
H05B 37/00 (2006.01)
H05B 39/00 (2006.01)
H05B 33/08 (2006.01)

(52) U.S. Cl.
CPC ........... *H05B 33/0815* (2013.01); *Y02B 20/346* (2013.01)

(58) Field of Classification Search
CPC .................... H05B 37/00; H05B 39/00
See application file for complete search history.

(56) References Cited

U.S. PATENT DOCUMENTS

| 5,442,534 A | 8/1995 | Cuk et al. |
| 5,442,539 A | 8/1995 | Cuk et al. |
| 8,860,322 B2 * | 10/2014 | Wei et al. .................. 315/200 R |
| 2003/0066555 A1 | 4/2003 | Hui et al. |

FOREIGN PATENT DOCUMENTS

| CN | 101867289 A | 10/2010 |
| EP | 1492219 A2 | 12/2004 |

(Continued)

OTHER PUBLICATIONS

Ricardo De Oliveira et al; "High-Power-Factor Electronic Ballast With Constant DC-Link Voltage", IEEE Transactions on Power Electronics, vol. 13, No. 6, Nov. 1998, pp. 1030-1037.

(Continued)

*Primary Examiner* — Hai L Nguyen
(74) *Attorney, Agent, or Firm* — Yuliya Mathis

(57) ABSTRACT

The present invention relates to a driver device (50a-50f) and a corresponding method for driving a load (22), in particular an LED unit comprising one or more LEDs (23). The proposed driver device comprises power input terminals (51, 52) for receiving a rectified supply voltage from an external power supply, power output terminals (53, 54) for providing a drive voltage and/or current for driving a load (22), a single stage power conversion unit (66a, 66b, 66c) coupled to the power input terminals (52) comprising a single switching element (60) and an energy storage element (Ch), both coupled to a switch node (55), wherein the power output terminals (53, 54) are represented by the output of said stage power conversion unit, a filter unit (68) coupled to said switch node (55), said filter unit comprising a filter inductor (Lc) and a filter capacitor (Cs), and a control unit (58) for controlling said switching element (60).

15 Claims, 11 Drawing Sheets

(56) References Cited

FOREIGN PATENT DOCUMENTS

| EP | 2045903 A2 | 8/2009 |
| EP | 2299569 A1 | 3/2011 |

OTHER PUBLICATIONS

Erickson et al, "Design of a Simple High-Power-Factor Rectifier Based on the Flyback Converter", IEEE Proceedings of the Applied Power Electronics Conferences and Expositions, 1990, pp. 792-801.

Chi, "Zero-Order Switching Networks and Their Applications to Power Factor Correction in Switching Converters", IEEE Transactions on Circuits and Systems—I: Fundamental Theory and Applications, vol. 44, No. 8, Aug. 1997, pp. 667-675.

Venkatraman et al, "A Soft-Switching Single-Stage AC-to-DC Converter With Low Harmonic Distortion—Analysis, Design, Simulation and Experimental Results", IEEE Transaction on Aerospace and Electronic Systems, vol. 36, No. 4 Oct. 1, 2000, pp. 662-668.

\* cited by examiner

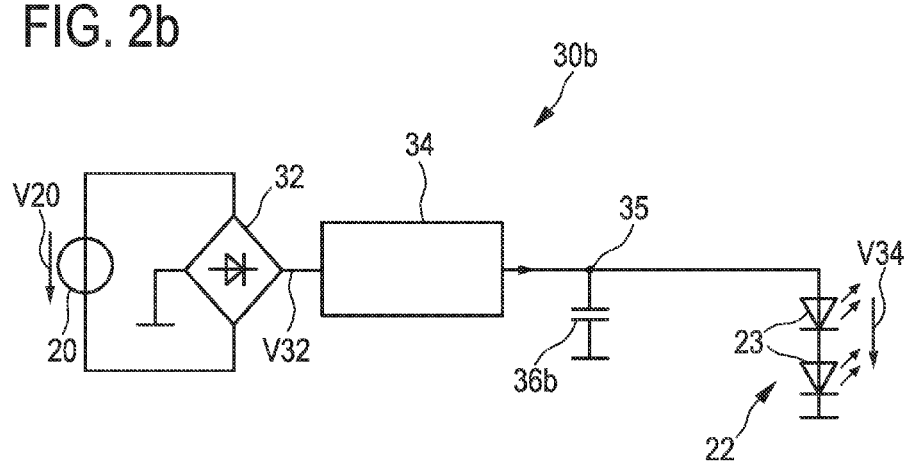

SINGLE SWITCH DRIVER DEVICE HAVING LC FILTER FOR DRIVING AN LED UNIT

FIELD OF THE INVENTION

The present invention relates to driver device for driving a load, in particular an LED unit comprising one or more LEDs. Further, the present invention relates to a light apparatus.

BACKGROUND OF THE INVENTION

In the field of LED drivers for offline applications such as retrofit lamps, solutions are demanded to cope with high efficiency, high power density, long lifetime, high power factor and low cost, among other relevant features. While practically all existing solutions compromise one or the other requirement, it is essential that the proposed driver circuits properly condition the form of the mains power into the form required by the LEDs while keeping compliance with present and future power mains regulations. Of critical importance is to guarantee a maximum light perceptible flicker (preferably zero) at the same time that the power factor is maintained above a certain limit.

Further, in off-line converters, energy from the power mains often needs be synchronously drawn in proportion to the supplied voltage waveform in order to achieve high power factor and low harmonic distortion. Power converter architectures with an independent preconditioner stage are traditionally employed to best accomplish this task without compromising the proper form of the energy to be delivered to the load.

Typically, two series connected power stages are employed to obtain high power factor while keeping the output power constant throughout a mains cycle (or supply cycle, i.e. the cycle of the mains voltage or the supply voltage). In those architectures the first stage shapes the mains' current and the second stage performs the power conversion to the load.

Nonetheless, for reasons related to complexity and cost, simplified powertrain solutions are adopted known conventionally as single-stage, where either of the two stages may essentially not be incorporated. As a consequence of such simplification, the aforementioned requirements may be largely compromised and/or the converter performance highly degraded, particularly in terms of size, reliability and lifetime. The latter is usually mainly attributed to the need of using a bulky low frequency storage capacitor in parallel to the load when constant output power delivery is to be guaranteed.

Single stage solutions are common in literature. One reference example is given in the work of Robert Erickson and Michael Madigan, entitled "Design of a simple high-power-factor rectifier based on the flyback converter", IEEE Proceedings of the Applied Power Electronics Conferences and Expositions, 1990, pp. 792-801.

An intermediate solution laying half-way between the two-stage and single-stage approaches is the single-stage converter with integrated preconditioner. Such a solution can feature reduced component count and high power density while keeping compliance with both load and power mains requirements. Other embodiments with a single power converting stage allow high power factor (HPF) by means of integrating a boost converter operating in discontinuous conduction mode. These converters actually combine the above mentioned two power conversion stages.

A HPF converter for compact fluorescent lamps is described in "High-Power-Factor Electronic Ballast with Constant DC-Link Voltage", by Ricardo de Oliveira Brioschi and José Luiz F. Vieira, IEEE Transactions on Power Electronics, vol. 13, no. 6, 1998. Here, a half bridge is shared by a boost converter and an LC parallel resonant converter, which is operated above resonance in order to obtain zero voltage switching (ZVS). To further support ZVS the bus voltage is controlled constant. Such a HPF converter, however, typically requires a large bus capacitor and an output rectifier and has only narrow supply voltage and load (drive) voltage ranges.

Another example of integrated power stages is the work of R. Venkatraman, A. K. S. Bhat and Mark Edmunds, entitled "Soft-switching single-stage AC-to-DC converter with low harmonic distortion", IEEE Transaction on Aerospace and Electronic Systems, vol. 36, no. 4, October 2000. In this work, a high frequency transformer isolated, Zero Voltage Switching (ZVS), single stage AC-DC converter with high power factor and low harmonic distortion is presented and analyzed for a constant power load.

SUMMARY OF THE INVENTION

It is an object of the present invention to provide a driver device for driving a load, in particular an LED unit comprising one or more LEDs, particularly providing a high power factor, a virtually constant load, small size, high efficiency, long lifetime and low cost. Further, it is an object of the present invention to provide a corresponding light apparatus.

According to an aspect of the present invention a driver device is provided comprising:
power input terminals for receiving a rectified supply voltage from an external power supply,
power output terminals for providing a drive voltage and/or current for driving a load,
a single stage power conversion unit coupled to the power input terminals comprising a single switching element and an energy storage element, both coupled to a switch node, wherein the power output terminals are represented by the output of said stage power conversion unit,
a filter unit coupled to said switch node, said filter unit comprising a filter inductor and a filter capacitor, and
a control unit for controlling said switching element.

According to another aspect of the present invention a light apparatus is provided comprising a light assembly comprising one or more light units, in particular an LED unit comprising one or more LEDs, and a driver device for driving said light assembly as provided according to the present invention.

Embodiments of the invention are defined in the dependent claims. It shall be understood that the claimed light apparatus has similar and/or identical preferred embodiments as the claimed device and as defined in the dependent claims.

The present invention is based on the idea to provide a single-stage power converter (i.e. the power conversion unit) with an integrated preconditioner that feature high power factor while delivering constant output power to the load. Only a few components are required, among which half/full bridge units and large electrolytic capacitors are avoided. This is achieved by properly controlling the power converter integrated with a low-pass filter represented by elements of the filter unit. Generally, only a single switch is required to perform the conversion function. The proposed driver device is particularly targeted for off-line LED drivers employing high voltage LED strings coupled to the power output terminals.

Compared to two-stage offline drivers for LEDs the problems of high cost, complexity and large component count, which are needed to keep compliance with the requirements of both power mains and load, are addressed and solved since the proposed driver device and method feature simplicity and reduced component count, wherein preferably conventional components are used.

Compared to single-stage offline drivers for LEDs the following problems are addressed. A large low frequency capacitor can be omitted by allowing a smaller low frequency storage capacitor voltage vary during the supply cycle or mains cycle (e.g. 20 . . . 80%) still while keeping the output current constant. This in turn translates into smaller size, longer lifetime and more reliable, particularly at high temperature operation. Further, reduced component count is needed compromising the requirements of neither power mains nor load. This is achieved intrinsically by the operation of the power stage with integrated preconditioning function. Still further, even with the use of a large low frequency storage capacitor, single stages may not fully eliminate perceptive flicker. The proposed solution enables constant output current and hence perceptive flicker can be minimized.

According to the present invention there are various basic configurations of the power conversion unit provided as different embodiments that cope with various load and input voltage ranges. All of them can be controlled over full load range down to virtually zero load current by means of manipulating the duty cycle only or the switching frequency or by burst mode operation.

The supply voltage may be a rectified periodic supply voltage provided by a power supply. In case an AC mains voltage is provided as input voltage to the power supply (or the power input terminals), e.g. from a mains voltage supply, a rectifier unit is used (as part of the driver device or as an external unit coupled to the power input terminals) for rectifying a provided AC input voltage, e.g. a mains voltage, into the (rectified periodic) supply voltage. Such a rectifier unit may, for instance, comprise a generally known half-wave or full-wave rectifier. The supply voltage thus has the same polarity for either polarity of the AC input voltage.

Alternatively, if e.g. such a rectified periodic supply voltage is already provided at the power input terminals, e.g. from a rectifier (representing said external power supply) provided elsewhere, no further or only general elements (like e.g. an amplifier) are coupled to the power input terminals for shaping the provided supply voltage.

There are various embodiments of the proposed driver device which distinguish mainly by the coupling of the various elements of the driver device.

In one embodiment said filter inductor and said filter capacitor are coupled in series, wherein a high voltage terminal of said filter unit is coupled to said switch node.

A low voltage terminal of said filter unit is, in one embodiment, coupled to a reference potential, in particular a ground potential and/or a power input terminal coupled to a power output terminal. In another embodiment the low voltage terminal of said filter unit is coupled to a power output terminal that is not connected to a power input terminal. The voltage and current stresses in devices from the converter may differ. The best options may depend on the type of components available in each case.

The single stage power conversion unit may comprise a Cuk-type, SEPIC-type or Zeta-type converter. A fundamental description of the basic Cuk, SEPIC, Zeta topologies is provided by Chi K. Tse, in "Zero-order switching networks and their applications to power factor correction in switching converters", IEEE Transactions on Circuits and Systems I: Fundamental theory and applications, vol. 44, no. 8, August 1997.

In an embodiment said single stage power conversion unit comprises a Cuk-type converter including a first inductor coupled between a first power input terminal and the switch node, said energy storage element, in particular an intermediate capacitor, coupled between said switch node and an intermediate node, a second inductor coupled between said intermediate node and a first power output terminal, and a diode coupled between said intermediate node and a second power output terminal. This embodiment provides the advantages of a low input/output ripple and the use of a ground referenced switch.

In another embodiment said single stage power conversion unit comprises a SEPIC-type converter including a first inductor coupled between a first power input terminal and the switch node, said energy storage element, in particular an intermediate capacitor, coupled between said switch node and an intermediate node, a diode coupled between said intermediate node and a first power output terminal, and a second inductor coupled between said intermediate node and a second power output terminal. This embodiment provides the advantages of a low input ripple and a ground referenced switch/output.

Preferably, in these embodiments said switching element is coupled between said switch node and a second power input terminal.

In still another embodiment said single stage power conversion unit comprises a Zeta-type converter including said switching element coupled between a first power input terminal and the switch node, a first inductor coupled between the switch node and a second power input terminal, a first diode coupled in series to said first inductor, said energy storage element, in particular an intermediate capacitor, coupled between said switch node and an intermediate node, a second inductor coupled between said intermediate node and a first power output terminal, and a second diode coupled between said intermediate node and a second power output terminal. This embodiment provides the advantages of a low output ripple and a ground referenced output.

The various embodiments are provided for use in different applications and different voltages, and are directed to achieve certain aims. Often, a trade-off is to be made to select the optimum embodiment.

Advantageously, an input decoupling capacitor coupled between the power input terminals and/or an output decoupling capacitor coupled between the power output terminals are additionally provided for high frequency decoupling.

Generally, the switching element can be implemented in various ways, e.g. including transistors (e.g. MOSFETs) or other controlled switching means.

The control unit is adapted for keeping the output current constant, to keep the voltage across the energy storage element below a predetermined threshold and/or to shape the input current. Zero voltage switching of the switching elements is arranged for by the design (components) of the proposed driver device. The tasks of the control are keeping the output current constant; possibly according to a reference current (set point), to keep the bus voltage (i.e. the voltage across the energy storage element) below a preset limit and/or to shape the input current.

BRIEF DESCRIPTION OF THE DRAWINGS

These and other aspects of the invention will be apparent from and elucidated with reference to the embodiment(s) described hereinafter. In the following drawings FIG. 2b shows a schematic block diagram of a known single stage driver device with output storage capacitor.

DETAILED DESCRIPTION OF THE INVENTION

Figure 1:
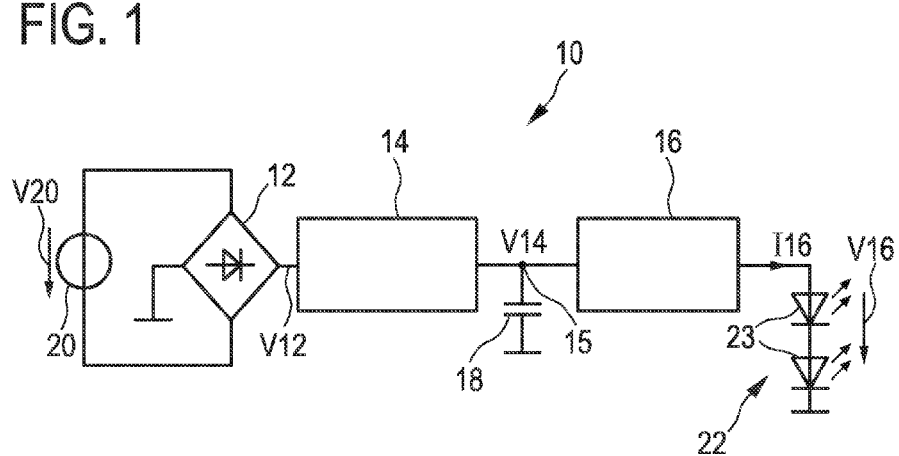
FIG. 1 shows a schematic block diagram of a known two stage driver device.

An embodiment of a known two stage driver device 10 is schematically shown in FIG. 1. Said driver device 10 comprises a rectifier unit 12, a first stage preconditioning unit 14 coupled to the output of the rectifier unit 12, a second stage conversion unit 16 coupled to the output of the first stage preconditioning unit 14 and a charge capacitor 18 coupled to the node 15 between said first stage preconditioning unit 14 and said second stage conversion unit 16. The rectifier unit 12 preferably comprises a rectifier unit, such as a known full-wave or half-wave rectifier, for rectifying an AC input voltage V20 provided, e.g., from an external mains voltage supply 20 into a rectified voltage V12. The load 22 is, in this embodiment, an LED unit comprising two LEDs 23 is coupled to the output of the second stage conversion unit 16 whose output signal, in particular its drive voltage V16 and its drive current I16, is used to drive the load 22.

The first stage preconditioning unit 14 preconditions the rectified voltage V12 into an intermediate DC voltage V14, and the second stage conversion unit 16 converts said intermediate DC voltage V14 into the desired DC drive voltage V16. The charge capacitor 18 is provided to store a charge, i.e. is charged from the intermediate DC voltage V14, thereby filtering the low frequency signal of the rectified voltage V12 to ensure a substantially constant output signal of the second stage conversion unit 16, in particular a constant drive current I16 through the load 22. These elements 14, 16, 18 are generally known and widely used in such driver devices 10 and thus shall not be described in more detail here.

Figure 2A:
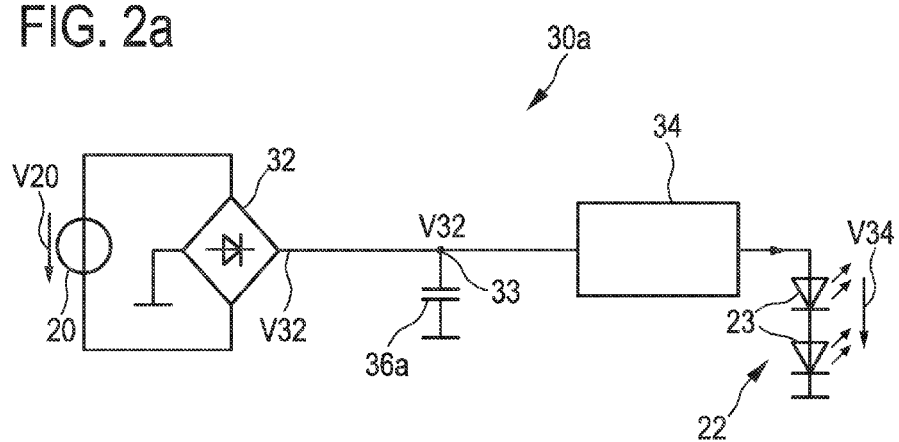
FIG. 2a shows a schematic block diagram of a known single stage driver device with input storage capacitor.

Generally, the driver device 10 complies with the aforementioned demand of high power factor and low flicker at the expense of larger space requirements and cost, which might be drastically limited particularly in retrofit applications. The size of the first stage preconditioning unit 14 may be mainly determined by the associated passive components, particularly if it comprises a switched mode power supply (SMPS), e.g. a boost converter, operating at low or moderated switching frequency. Any attempt to increase the switching frequency so as to reduce the size of these filter components may yield a rapid increase of energy losses in the hard-switched SMPS and hence the need of use of larger heatsinks Embodiments of known single stage driver devices 30a, 30b are schematically shown in FIG. 2a and FIG. 2b. Said driver device 30 comprises a rectifier unit 32 (that may be identical to the rectifier unit 12 of the two stage driver device 10 shown in FIG. 1) and a conversion unit 34 (e.g. flyback converter for the embodiment shown in FIG. 2b or a buck converter for the embodiment shown in FIG. 2a) coupled to the output of the rectifier unit 32. Further, in the embodiment shown in FIG. 2a a charge capacitor 36a (representing a low frequency input storage capacitor) is coupled to the node 33 between said rectifier unit 32 and said conversion unit 34 is provided. In the embodiment shown in FIG. 2b the charge capacitor 36b (representing a low frequency output storage capacitor) is coupled to the node 35 between said conversion unit 34 and the load 22. The rectifier unit rectifies an AC input voltage V20 provided, e.g., from an external mains voltage supply (also called power supply) 20 into a rectified voltage V32. The rectified voltage V32 is converted into the desired DC drive voltage V34 for driving the load 22.

The storage capacitors 18 (in FIG. 1) and 36a, 36b (in FIGS. 2a, 2b) are mainly provided to filter out the low frequency component of the rectified voltage V12 in order to allow for a constant current into the load. Such capacitors are therefore large, particularly when placed in parallel to the load and when such load is an LED.

Driver devices as shown in FIGS. 1 and 2 are, for instance, described in Robert Erickson and Michael Madigan, "Design of a simple high-power-factor rectifier based on the flyback converter", IEEE Proceedings of the Applied Power Electronics Conferences and Expositions, 1990, pp. 792-801.

Most of those single stage driver devices 30a, b can, although featuring a lower number of hardware components compared to two stage driver devices as exemplarily shown in FIG. 1, generally not offer a high power factor and a low perceptible flicker simultaneously due to limitations in the size of the charge capacitor, which must filter out the low frequency component of the AC input voltage. In addition, single stage driver devices may critically compromise the size, the lifetime and the maximum temperature operation of the load (e.g. a lamp) due to the use of large storage capacitors used to mitigate perceptible flicker.

FIGS. 3 to 5 depict several embodiments of three different basic configurations of a driver device according to the present invention. Each configuration (embodiments of configuration 1 being shown in FIG. 3, embodiments of configuration 2 being shown in FIG. 4, embodiments of configuration 3 being shown in FIG. 5) is represented by two different embodiments of the proposed driver device including a single-stage power conversion unit and a filter unit. For each proposed configuration, two different embodiments will be explained for connecting the filter capacitor (also called low frequency storage capacitor) Cs to either ground or the load.

All three configurations show a self-stabilizing behaviour, which allows controlling the output current constant at predetermined voltage ripple across the (low frequency) storage capacitor Cs. A boost inductor Lm of the power conversion unit is designed for discontinuous conduction mode, for which purpose an additional diode (Dm) is coupled in series to said boost inductor in an embodiment. Further, all configurations are suitable for high voltage loads, e.g. high voltage strings of LEDs, but low voltage is also possible. As the load may vary, the capacitor voltage can be controlled to be maintained constant by varying the switching frequency. The switching frequency increases as the output current decreases.

The embodiment of type 1 (i.e. the embodiments shown in FIGS. 3a, 4a, 5a) and of type 2 (i.e. the embodiments shown in FIGS. 3b, 4b, 5b) within each configuration are thus to a large extent equivalent, but can be distinguished in terms of performance and voltage stresses across capacitors and switch. Because of their similarity mainly the embodiments of type 2 will mainly be described in the following.

Figure 3A:
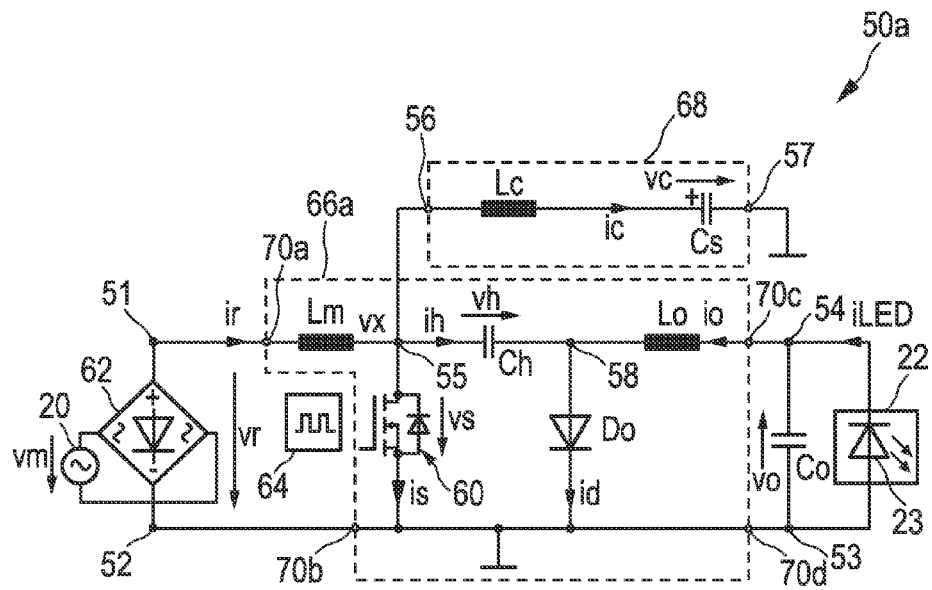
FIG. 3 shows schematic block diagrams of two embodiments of a first configuration of a driver device according to the present invention.
Figure 3B:
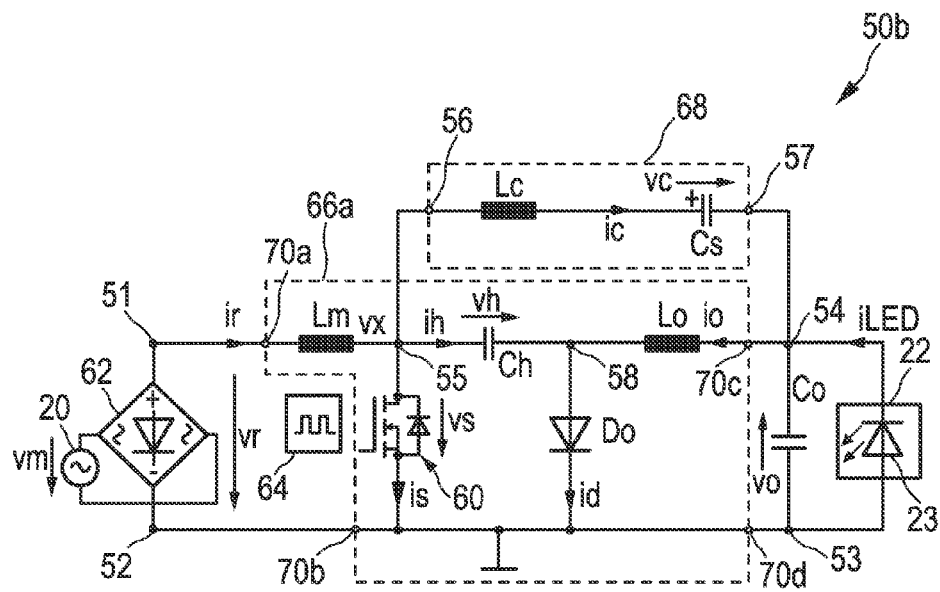
Figure 4A:
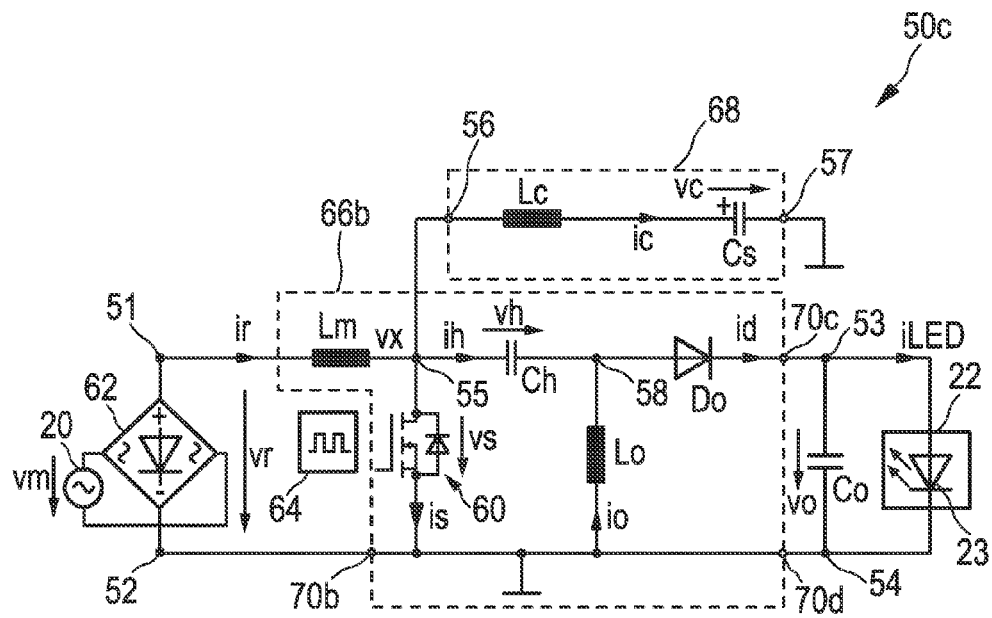
FIG. 4 shows schematic block diagrams of two embodiment of a second configuration of a driver device according to the present invention.
Figure 4B:
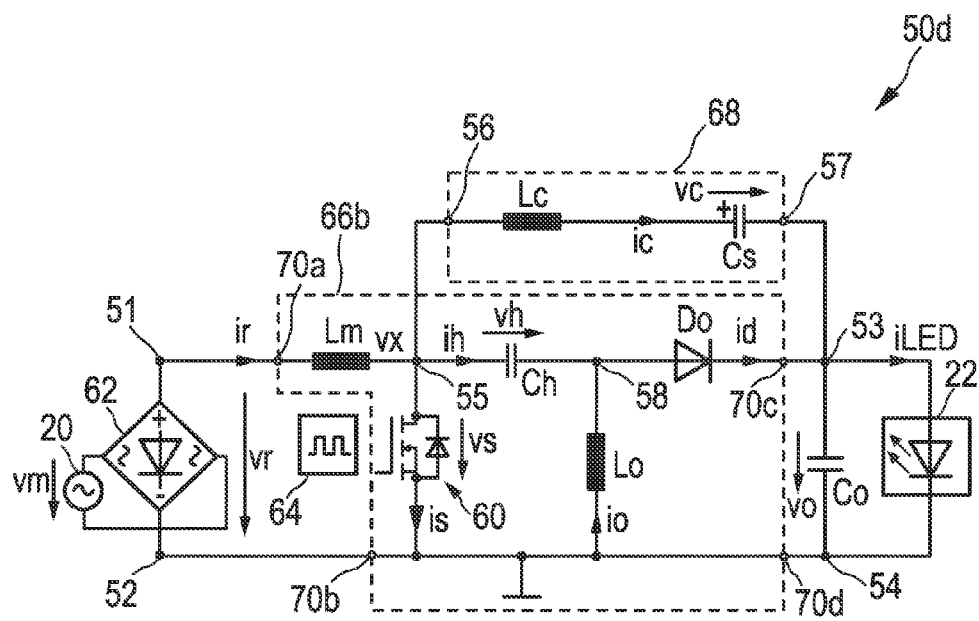
Figure 5A:
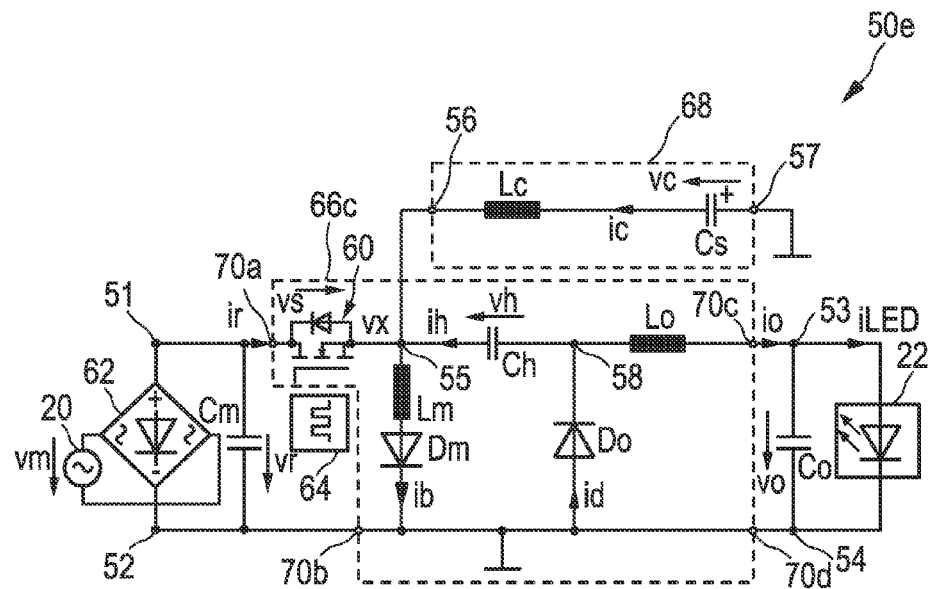
FIG. 5 shows schematic block diagrams of two embodiment of a third configuration of a driver device according to the present invention.

The diagrams shown in FIGS. 6 to 10 refer to the three configurations shown in FIGS. 3, 4 and 5. They illustrate both low frequency steady-state waveforms (FIGS. 6, 8, 9) and high frequency switching waveforms (FIGS. 7, 10) of the first, third and fifth embodiments shown in FIGS. 3a, 4a, 5a. The switching waveforms of the embodiments 50b and 50d are equivalent so that the switching waveforms of embodiment 50d are not shown again separately. In all cases, an LED load including a series connection of LED units is chosen to operate at 10 W constant power, meaning that the output current must be constant. The rectified AC input signal refers to the European mains. Other type of loads and power supplies are possible as well. In all illustrated embodiments herein, the resulting power factor (or PF) is higher than or equal to 90%, whereas the total harmonic distortion (or THD) is lower than 40%.

It should be noted that the duty cycle refers to the switch operation, e.g. 100% duty cycle implies that the switching element 60 is always on (closed). The switched node voltage is represented by vx.

A first embodiment of a driver device 50a according to the present invention is schematically shown in FIG. 3a. It comprises power input terminals 51, 52 for receiving a rectified supply voltage vr from an external power supply 20 (e.g. a mains voltage supply providing a mains voltage vm) which is rectified by a rectifier 62. The driver device 50a further comprises power output terminals 53, 54 for providing a drive voltage vo and/or current io for driving a load 22. In this context it shall be noted that the current io is the current through the load 22 in this embodiment (as well as in the below explained embodiments shown in FIGS. 4a, 5a), which this is not the case for the other embodiments.

Further, the driver device 50a comprises a single stage power conversion unit 66a coupled with its input terminals 70a, 70b to the power input terminals 51, 52 and with its output terminals 70c, 70d to the power output terminals 53, 54. Said power conversion unit 66a comprises a single switching element 60 and an energy storage element Ch, in particular a single capacitor, both coupled to a switch node 55.

Further, the driver device 30a comprises a filter unit 68 comprising a filter inductor Lc and a filter capacitor Cs. The high voltage terminal 56 (connected to the filter inductor Lc) of said filter unit 68 is coupled to said switch node 55, while the low voltage terminal 57 (connected to the filter capacitor Cs) of said filter unit 68 is coupled to ground.

A control unit 64 (e.g. a controller, processor or computer that is appropriately designed or programmed) is provided for controlling said switching element 60.

For high frequency decoupling an (optional) input decoupling capacitor Cm (see FIG. 5; not shown in FIGS. 3 and 4), coupled between the power input terminals 51, 52 and an (optional) output decoupling capacitor Co coupled between the power output terminals 53, 54 are additionally provided in the embodiments. The low power input terminal 52 and the high power output terminal 53 are both coupled to ground.

The Cuk-type power conversion unit 66a comprises a first inductor Lm coupled between the high power input terminal 51 and the switch node 55. The energy storage element Ch, in particular an intermediate capacitor, is coupled between said switch node 55 and an intermediate node 58. A second inductor Lo is coupled between said intermediate node 58 and a first power output terminal 54. Finally, a diode Do is coupled between said intermediate node 58 and the low power output terminal 54. The switching element 60 is coupled between said switch node 55 and the low power input terminal 52.

A second embodiment of a driver device 50b according to the present invention is schematically shown in FIG. 3b. Compared to the first embodiment of the driver device 50a the low voltage terminal 57 of said filter unit 68 is coupled to the low power output terminal 54 and not to ground. The other elements and couplings are the same as in the first embodiment of the driver device 50a.

Hence, in the first and second embodiments of the driver device 50a, 50b the circuit combines a power converter of the Cuk-type with a low-pass filter including a series connection of a high frequency filter inductor Lc and a low frequency (mains frequency) storage capacitor Cs, which is connected between switch node 55 and the load (in case of the second embodiment) or between switch node 55 and ground (in case of the first embodiment). Differences in performance and stress voltages across capacitors and switch can be relevant between both embodiments.

Further, in case of the second embodiment, the output inductor current io carries both the output load current and the storage capacitor current. Maximum stress voltage across the switching element 60 is the voltage across the capacitor Ch, which equals Vo/d, where d represents the duty cycle. The storage capacitor voltage vc is generally higher than the mains rectifier voltage vr and the output load voltage vo.

Figure 6:
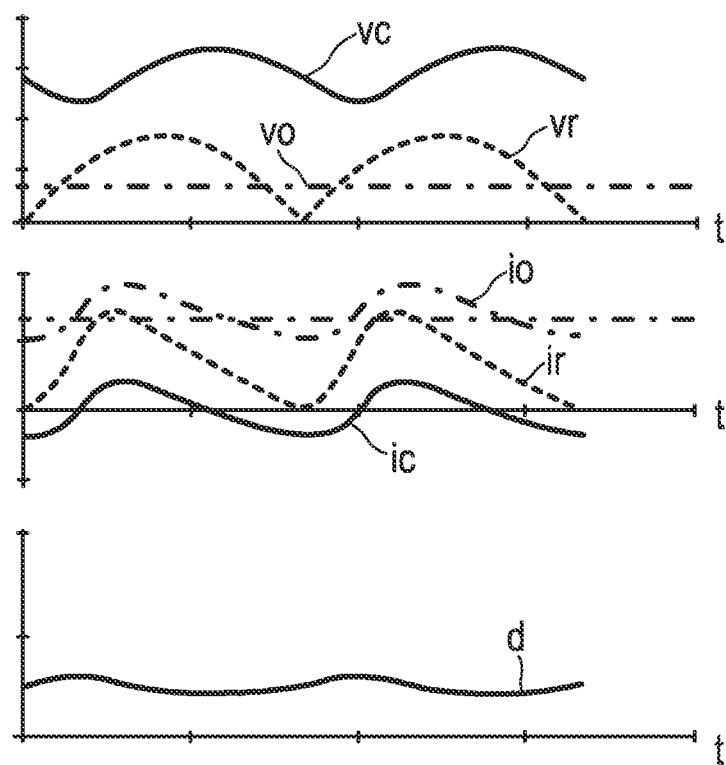
FIG. 6 shows diagrams of voltages and currents during one low frequency cycle in an embodiment of the first configuration of the proposed driver device.
Figure 7:
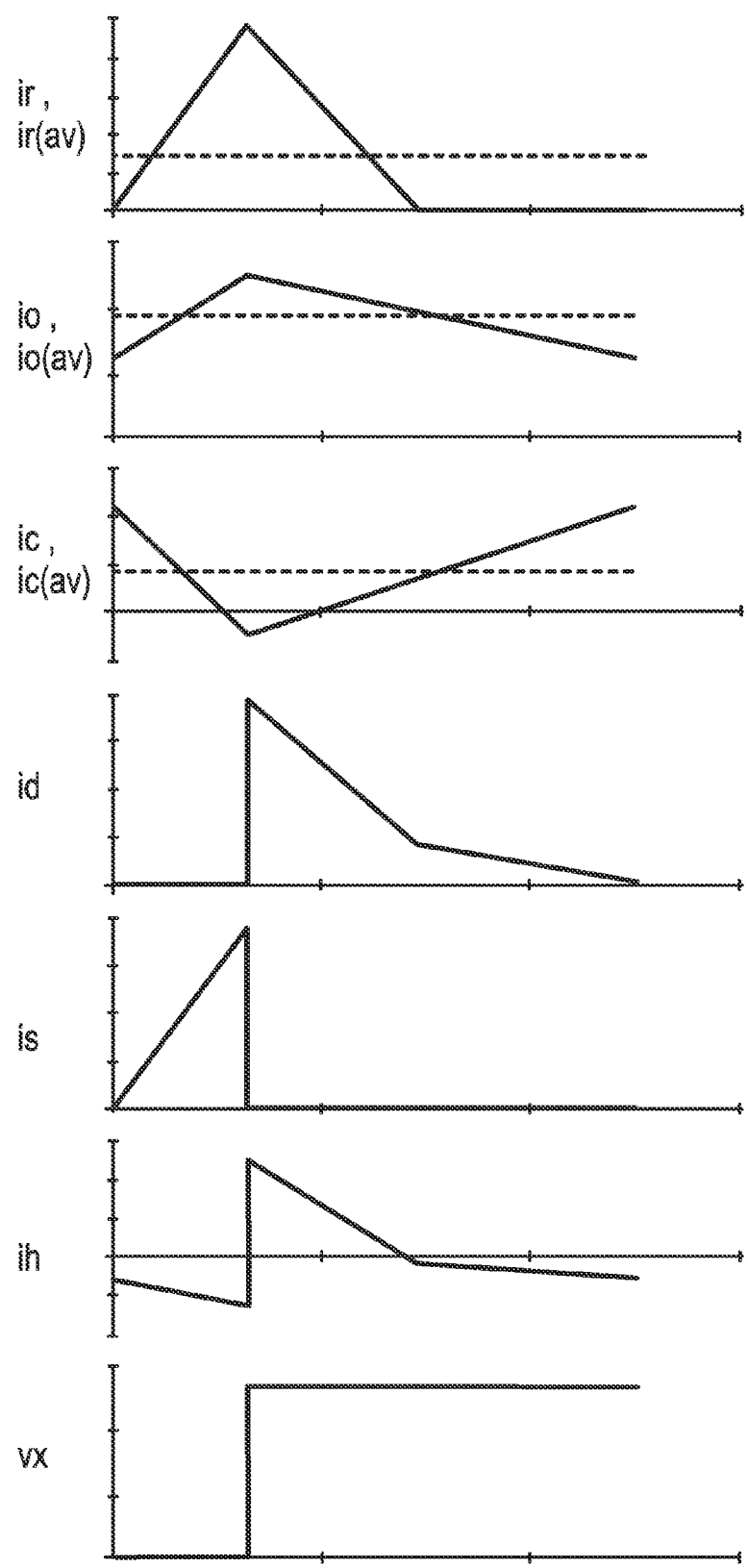
FIG. 7 shows diagrams of various currents during one high frequency cycle in an embodiment of the first configuration of the proposed driver device.

As shown in FIG. 6, the average input current ir(av) equals zero at the zero crossings of the rectified mains voltage vr. The duty cycle d is proportional to the output load voltage vo and inversely proportional to the storage capacitor voltage vc. FIG. 7 shows the high switching frequency waveforms at time 3 ms after the zero crossing of the mains cycle voltage. FIG. 7 reveals the discontinuous conduction operation mode of the input current ir. Continuous conduction mode is guaranteed at the output since diode current id is always present during the off time of the switch 60. This however is not necessary and discontinuous conduction mode at the output may be allowed.

In the example, the storage capacitor Cs can be as low as 1 µF (i.e. 100 nF/W) while guaranteeing a constant output power and a high power factor. By virtue of the step-down conversion, the load voltage vo can be substantially lower than the supply peak voltage (e.g. 70V in case of US mains supply). The low-pass filter of the Cuk converter provides good high frequency filtering to maintain a low current ripple at the load 22.

For the example of the steady-state waveforms shown in FIG. 6 and the high-frequency waveforms at phase angle $0.18\pi$ from mains cycle shown in FIG. 7 (both shown for the second embodiment of the driver device 50b) the following values apply: vm=120 Veff, 60 Hz, 200 kHz switching frequency, Lm=400 µH, Lc=Lo=2 mH, Po=10 W, vo=70V, Cs=1 µF, PF=95%, THD=23%, maximum voltage stress across switch=337V. The term "av" refers to the average component over a switching cycle. d indicates the duty cycle.

A third and a fourth embodiment of a driver device 50c, 50d according to the present invention are schematically shown in FIGS. 4a and 4b. These embodiments are substantially identical to the embodiments of the driver device 50a, 50b, but here in these embodiments the Cuk-type power conversion unit 65a is replaced by a SEPIC-type power conversion unit 65b. Further, the polarity of the power output terminals 53, 54 and the load 22 is reversed.

The SEPIC-type power conversion unit 65b comprises a first inductor Lm coupled between the high power input terminal 51 and the switch node 55. The energy storage element Ch, in particular an intermediate capacitor, is coupled between said switch node 55 and an intermediate node 58. A diode Do is coupled between said intermediate node 58 and the high power output terminal 53. Finally, a second inductor Lo is coupled between said intermediate node 58 and the low power output terminal 54. The switching element 60 is coupled between said switch node 55 and the low power input terminal 52.

Hence, in the third and fourth embodiments of the driver device 50c, 50d the circuit combines a power converter of the SEPIC-type with a low-pass filter including a series connection of a high frequency filter inductor Lc and a low frequency (mains frequency) storage capacitor Cs, which is connected between switch node 55 and the load (in case of the fourth embodiment) or between switch node 55 and ground (in case of the third embodiment). Differences in performance and stress voltages across capacitors and switch can be relevant between the two embodiments. Further, in case of the fourth embodiment, the output inductor current io carries, in average, the output load current id minus the storage capacitor current ih. The maximum stress voltage across the switch 60 equals the voltage vh across capacitor Ch plus the output voltage vo. The storage capacitor voltage vh is generally higher than the output voltage vo and can substantially oscillate more than 30% of its peak voltage.

Figure 8:
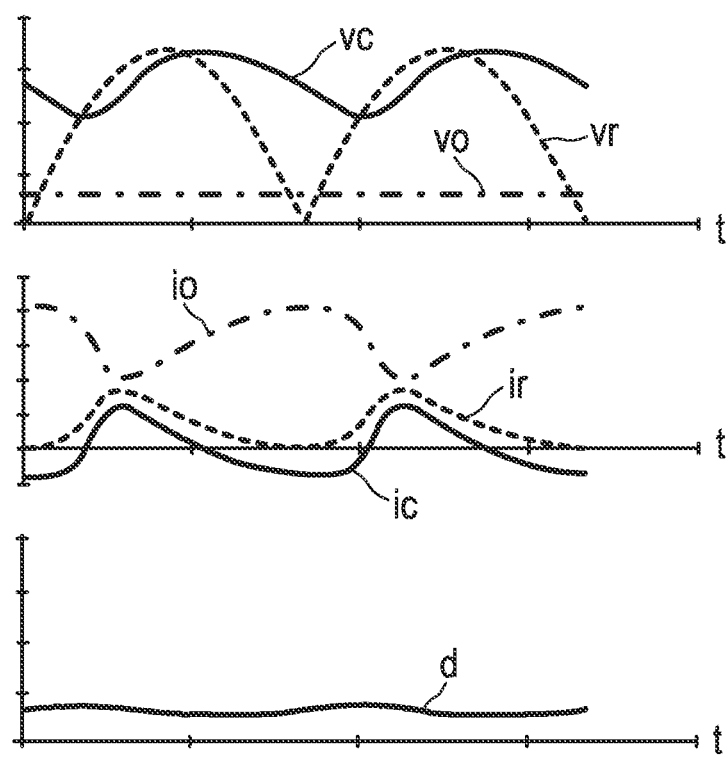
FIG. 8 shows diagrams of voltages and currents during one low frequency cycle in an embodiment of the second configuration of the proposed driver device.

As shown in FIG. 8, the average input current ir(av) equals zero at the zero crossings of the rectified mains voltage vr. The duty cycle d is proportional to the output load voltage vo and inversely proportional to the storage capacitor voltage vh plus two times the output load voltage vo. The high switching frequency waveforms are equivalent to those of the second embodiment shown in FIG. 7.

In the given example, the storage capacitor Ch can be as low as 4 µF while guaranteeing a constant output power and a high power factor. By virtue of the step-down conversion, the load voltage vo can be substantially lower than the supply peak voltage (e.g. 30V in case of US mains supply).

For the example of the steady-state waveforms shown in FIG. 8 (shown for the fourth embodiment of the driver device 50d) the following values apply: vm=120 Veff, 60 Hz, 200 kHz switching frequency, Lm=300 µH, Lc=Lo=2 mH, Po=10 W, vo=30V, Cs=4 µF, PF=92%, THD=35%, maximum voltage stress across switches=228V.

Figure 5B:
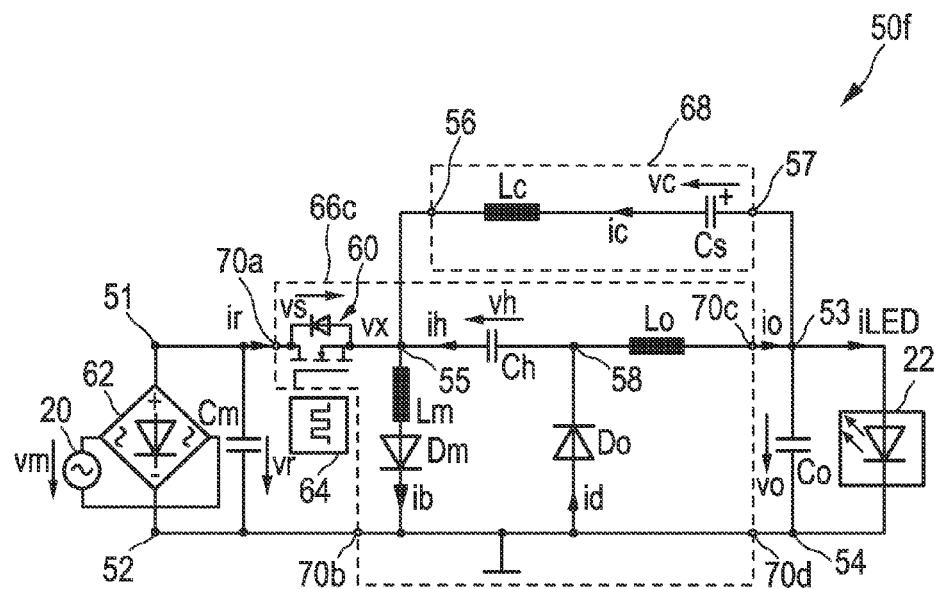

A fifth and a sixth embodiment of a driver device 50e, 50f according to the present invention are schematically shown in FIGS. 5a and 5b. These embodiments are substantially identical to the embodiments of the driver device 50c, 50d, but here in these embodiments the SEPIC-type power conversion unit 65b is replaced by a Zeta-type power conversion unit 65c. Further, the polarity of the capacitors Cs and Ch is reversed.

The Zeta-type power conversion unit 65c comprises a switching element 60 coupled between a high power input terminal 51 and the switch node 55. A first inductor Lm is coupled between the switch node 55 and the low power input terminal 52. A first diode Dm is coupled in series to said first inductor Lm. The energy storage element Ch, in particular an intermediate capacitor, is coupled between said switch node 55 and an intermediate node 58. A second inductor Lo is coupled between said intermediate node 58 and the high power output terminal 53. Finally, a second diode Do is coupled between said intermediate node 58 and the low power output terminal 54.

Hence, in the fifth and sixth embodiments of the driver device 50e, 50f the circuit combines a power converter of the Zeta-type with a low-pass filter including a series connection of a high frequency filter inductor Lc and a low frequency (mains frequency) storage capacitor Cs, which is connected between switch node 55 and the load (in case of the sixth embodiment) or between switch node 55 and ground (in case of the fifth embodiment). Differences in performance and stress voltages across capacitors and switch can be relevant between the two embodiments. Further, in case of the sixth embodiment, the output inductor current io carries both the output load current id and the storage capacitor current ih. The maximum stress voltage across the switch 60 equals the voltage vh across capacitor Ch plus the rectified mains voltage vr. The storage capacitor voltage vh is generally higher than the mains rectifier voltage vr and the output load voltage vo.

Figure 9:
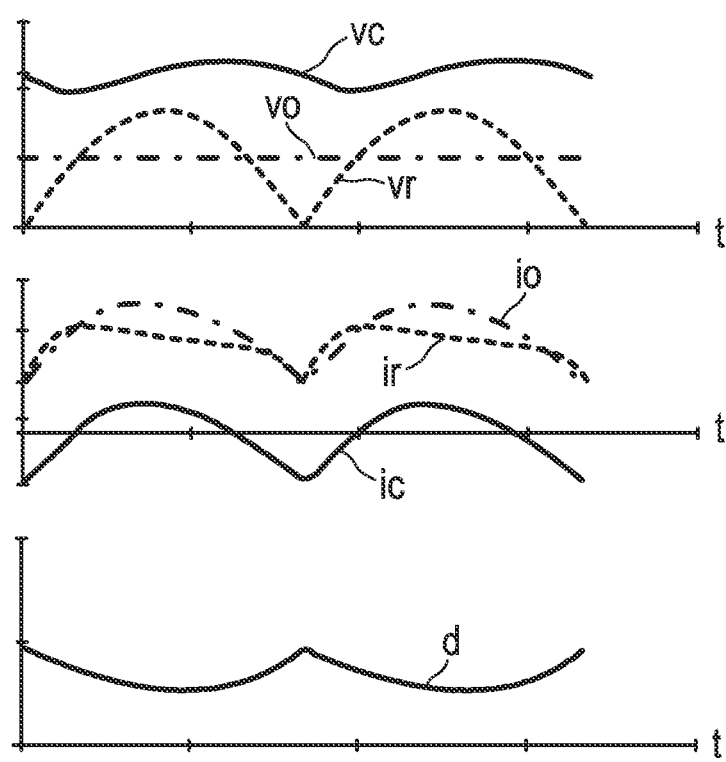
FIG. 9 shows diagrams of voltages and currents during one low frequency cycle in an embodiment of the third configuration of the proposed driver device.

As shown in FIG. 9, the average input current ir(av) does not in this configuration (and unlike the other configurations) equal zero at the zero crossings of the rectified mains voltage vr. The duty cycle d is proportional to the output load voltage vo and inversely proportional to the rectified mains voltage vr minus the storage capacitor voltage vh.

Figure 10:
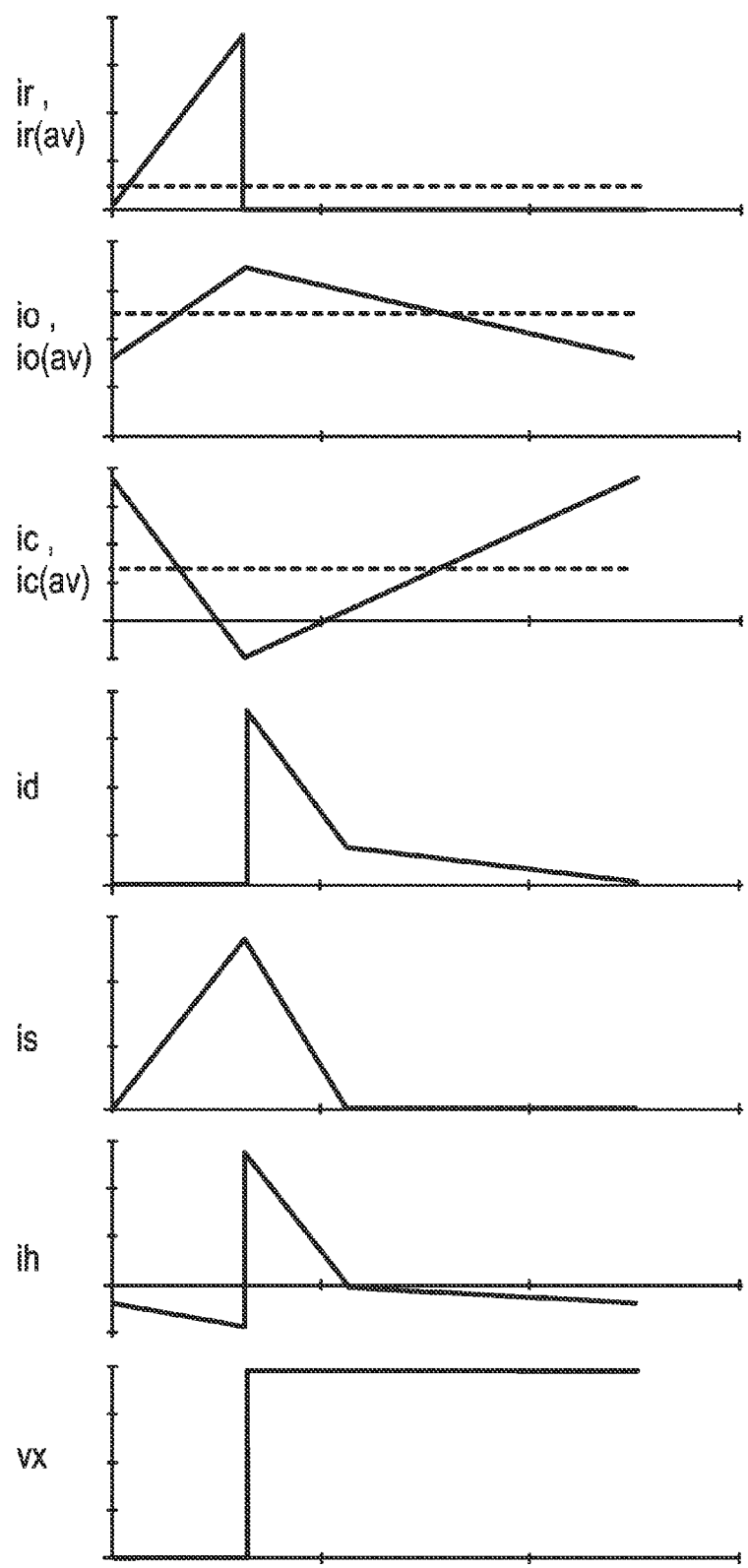
FIG. 10 shows diagrams of various currents during one high frequency cycle in an embodiment of the third configuration of the proposed driver device.

FIG. 10 shows the high switching frequency waveforms at time 3 ms after the zero crossing of the mains cycle voltage. FIG. 10 reveals the discontinuous conduction operation mode of the boost inductor Lm. Continuous conduction mode is guaranteed at the output since diode current id is always present during the off time of the switch 60. This however is not necessary and discontinuous conduction mode at the output may be allowed.

In the example, the storage capacitor can be as low as 2 µF (i.e. 200 nF/W) while guaranteeing a constant output power and a high power factor. By virtue of the step-down conversion, the load voltage vo can be substantially lower than the supply peak voltage (e.g. 100V in case of US mains supply). The low-pass filter of the Zeta stage provides good high frequency filtering to maintain a low current ripple at the LED load. The high frequency decoupling capacitor Cm is preferably used at the input as the rectified input current it may go negative under some operating conditions.

For the example of the steady-state waveforms shown in FIG. 9 and the high-frequency waveforms at phase angle 0.18π from mains cycle shown in FIG. 10 (both shown for the sixth embodiment of the driver device 50f) the following values apply: vm=120 Veff, 60 Hz, 200 kHz switching frequency, Lm=400 µH, Lc=Lo=4 mH, Po=10 W, vo=100V, Cs=2 µF, PF=94%, THD=36%, maximum voltage stress across switches=398V.

Figure 11:
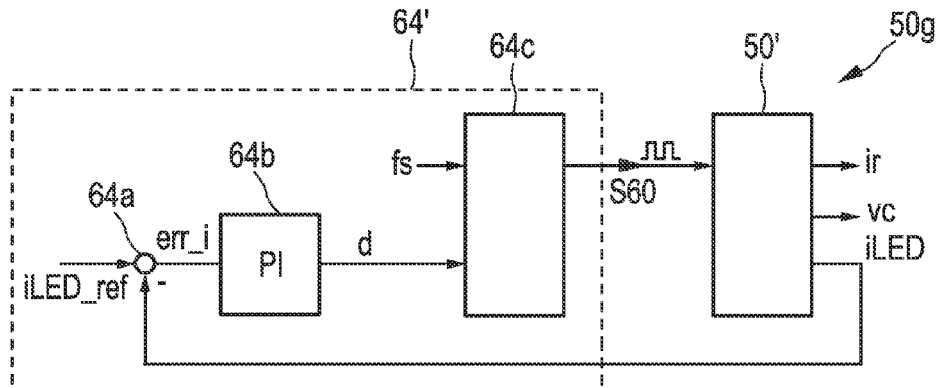
FIG. 11 shows a first embodiment of a control unit of the proposed driver device.

Next, the control method and device according to the present invention shall be explained. FIG. 11 shows another embodiment of a driver device 50g including a first embodiment of the control unit 64' (the other parts of the driver device are schematically indicated by a single block 50'). The LED current iLED is measured and compared to a (preset or variable) reference current iLED_ref in a comparison element 64a. The control error err_i is processed in a controller block 64b (indicated by PI) resulting in the duty cycle d as manipulating variable. Together with preset switching frequency fs a gate driving signals, representing the control signal S60 for the switching element 60 is formed in a (gate) driver block 64c.

Figure 12:
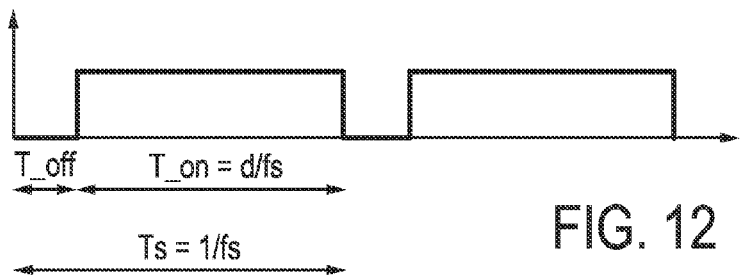
FIG. 12 shows the switching signal of the single switching element of the driver device.

FIG. 12 shows a timing diagram for the (gate of the) the switching element 60.

The duty cycle is basically related to the control error as typically done in a buck converter. Regarding the embodiments of the driver device 50g, a positive control error err_i (to little current) causes an increase of d and vice versa.

Self stabilizing behavior guarantees proper power balance without exceeding the limits of voltage stress across Cs. This is achieved by the proposed circuit arrangements as well as the control schemes adopted. If e.g. more power is drawn in average from the input than is taken from the output, the bus voltage vc will increase which in response will cause the control to decrease d, which in turn will reduce input power. In same manner the other embodiments can be operated, wherein the meaning of the duty cycle is toggled, i.e. d is to be replaced by 1-d for the embodiments of the driver device 50b, 50d, 50f compared to the embodiment of the driver device 50a, 50c, 50e. Other operation characteristics as the bus voltage and mains current (PF) are generally not explicitly controlled. They result from design and operation choices and tolerances.

In a further embodiment the maximum bus voltage is also explicitly controlled by means of the control, in particular by manipulating also the switching frequency. While still manipulating d to control the output current, fs is increased in response to an increasing bus voltage (as a result e.g. of a high mains voltage or a high output voltage). Alternatively, it is also possible to separately control T_on and T_off, which however will result in a similar switching pattern.

To avoid too high bus voltages (i.e. to avoid over boosting) in case the reference signal iLED_ref is variable and reduced far below its rated max. value, in a further embodiment the control enters a burst mode, i.e. switches off the converter periodically at a burst frequency below fs (e.g. 10 to 1000 times). Furthermore, and alternatively to frequency modulation for bus voltage control, fs can be used to shape the input current, either to improve the PF or to better comply with certain kinds of wall plug dimmers.

Figure 13:
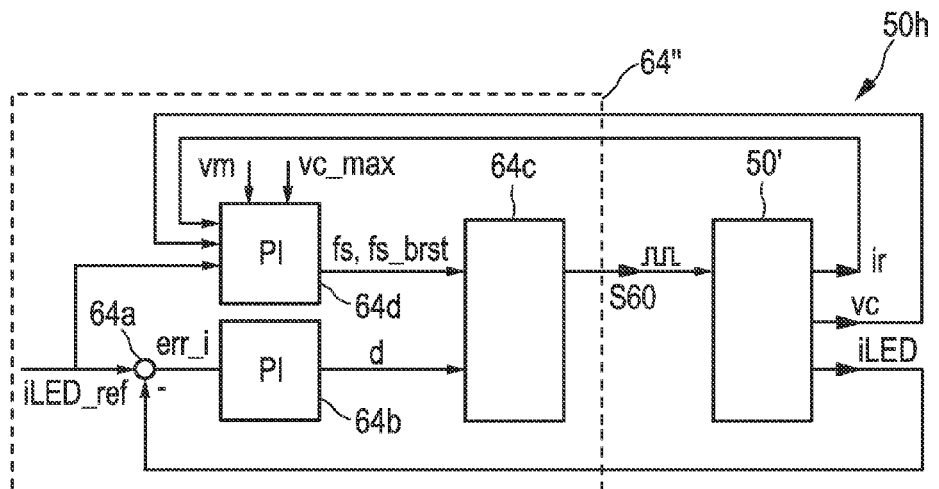
FIG. 13 shows a second embodiment of a control unit of the proposed driver device.

Still another embodiment of a driver device 50h including a second embodiment of the control unit 64" is depicted in FIG. 13. Compared to the embodiment shown in FIG. 11 the control unit 64" additionally comprises a second controller block 64d (indicated by PI) resulting in the switching frequency fs and fs_brst as manipulating variable provided to the (gate) driver block 64c. The second controller block 64d receives as input the reference current iLED_ref, the bus voltage vc, the input current ir, the input voltage vm and the maximum bus voltage vc_max.

According to the present invention a driver device is proposed including a single-stage power converter topology with integrated preconditioner that feature high power factor while delivering constant output power to the load. Only a few components are required, among which half/full switch bridges and large electrolytic capacitors are avoided. This is achieved by properly controlling the power converter integrated with a low-power filter. Generally, only a single switch (e.g. a MOSFET transistor) is required to perform the conversion function. The resulting driver devices are preferably usable for off-line LED drivers employing high voltage LED strings.

According to embodiments of the present invention one boost inductor is operating in discontinuous conduction mode. To enforce this, a diode is preferably coupled in series (either that of the input rectifier bridge or a dedicated one). Two inductors are preferably used to filter out the high switching frequency current components. Preferably, one high frequency decoupling capacitor is coupled at the output and, in some cases, a second one also at the input (i.e. output of the rectifier bridge).

The switch node is further connected to a third inductor, in particular a high frequency inductor, which is connected in series to the small low frequency storage capacitor, thus forming a filter. The switch node is further connected to high frequency capacitor used as an intermediate storage element to transfer energy to the outputs within a switching cycle. The rectifier mains can be connected to either the boost inductor or to the switch.

One terminal of the low frequency storage capacitor can be connected to either ground or to the load. Further, either only the load (e.g. LED) current is controlled constant (e.g. by duty cycle) or both LED current and bus voltage are controlled in two loops with manipulating the frequency, too.

The present invention is applied in consumer and "prosumer" (professional consumer) drivers, as LED drivers, above 2 W, e.g. either integrated into a luminaire or external for HV LEDs. Further applications are non-mains isolated professional drivers with relaxed THD requirement (e.g. 20%) and HV LED string loads.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A driver device for driving an LED unit comprising one or more LEDs, said driver device comprising:
    power input terminals for receiving a rectified supply voltage from an external power supply,
    power output terminals for providing a drive voltage and/or current for driving a load,
    a single stage power conversion unit coupled to the power input terminals comprising a single switching element and an energy storage element, both coupled to a switch node, wherein the power output terminals are represented by the output of said stage power conversion unit,
    a first inductor coupled between the switch node and a power input terminal,
    a filter unit coupled to said switch node, said filter unit comprising a filter inductor and a filter capacitor, and
    a control unit for controlling said switching element, wherein
        said energy storage element is coupled between said switch node and an intermediate node,
        a second inductor is coupled between said intermediate node and a power output terminal, and
        a diode is coupled between said intermediate node and a power output terminal.

2. The driver device as claimed in claim 1, wherein said filter inductor and said filter capacitor are coupled in series, wherein a high voltage terminal of said filter unit is coupled to said switch node.

3. The driver device as claimed in claim 2, wherein a low voltage terminal of said filter unit is coupled to a reference potential, in particular a ground potential, and/or a power input terminal coupled to a power output terminal.

4. The driver device as claimed in claim 2, wherein a low voltage terminal of said filter unit is coupled to a power output terminal that is not directly connected to a power input terminal.

5. The driver device as claimed in claim 1, wherein said single stage power conversion unit comprises a Cuk-type, SEPIC-type or Zeta-type converter.

6. The driver device as claimed in claim 1, wherein said single stage power conversion unit comprises a Cuk-type converter, said switching element is coupled between the switch node and the first output terminal, the second inductor is coupled between said intermediate node and a first power output terminal, and the diode is coupled between said intermediate node and a second power output terminal.

7. The driver device as claimed in claim 1, wherein said single stage power conversion unit comprises a SEPIC-type converter, said switching element is coupled between the switch node and the first output terminal, the second inductor is coupled between said intermediate node and a second power output terminal, and the diode is coupled between said intermediate node and a first power output terminal.

8. The driver device as claimed in claim 6, wherein said switching element is coupled between said switch node and a second power input terminal.

9. The driver device as claimed in claim 1, wherein said single stage power conversion unit comprises a Zeta-type converter, said switching element is coupled between a first power input terminal (51) and the switch node, a first diode is coupled in series to said first inductor, the second inductor is coupled between said intermediate node and a first power output terminal, and the second diode coupled between said intermediate node and a second power output terminal.

10. The driver device as claimed in claim 1, further comprising an input decoupling capacitor coupled between the power input terminals.

11. The driver device as claimed in claim 1, further comprising an output decoupling capacitor coupled between the power output terminals.

12. The driver device as claimed in claim 1, wherein a second power input terminal and a second power output terminal are connected to a reference potential.

13. The driver device as claimed in claim 1, further comprising a rectifying unit for rectifying an AC supply voltage, into said rectified periodic supply voltage.

14. The driver device as claimed in claim 1, wherein the control unit is adapted for keeping the output current constant, to keep the voltage across the energy storage element below a predetermined threshold and/or to shape the input current.

15. A light apparatus comprising:
a light assembly comprising one or more LED units comprising one or more LEDs, and
a driver device for driving said light assembly as claimed in claim 1.

* * * * *